March 14, 1944. W. G. WILSON Re. 22,455
VALVE
Original Filed Jan. 31, 1941 2 Sheets-Sheet 1
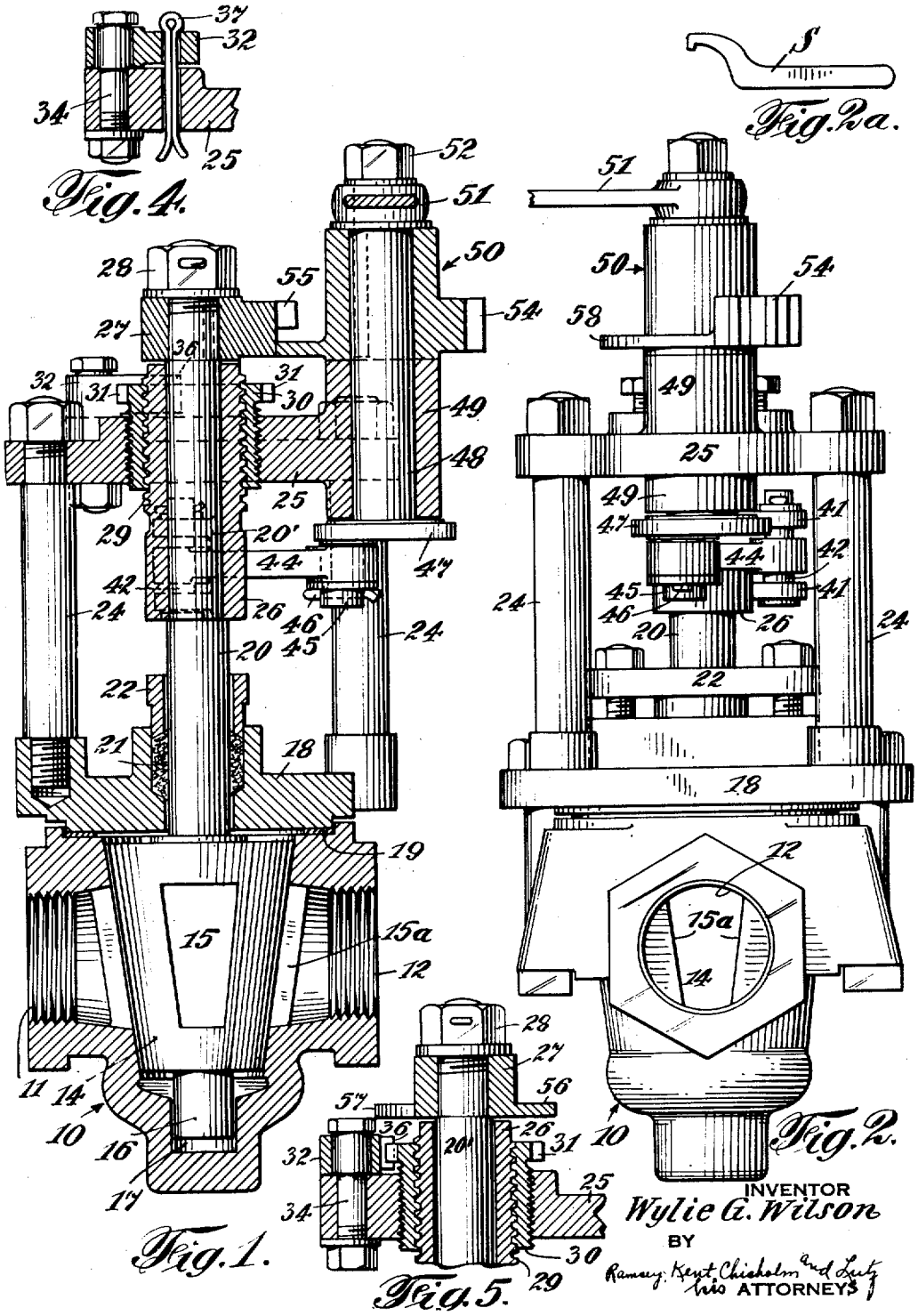
INVENTOR
Wylie G. Wilson
BY
Ramsey, Kent, Chisholm and Lutz
his ATTORNEYS March 14, 1944. W. G. WILSON Re. 22,455

VALVE

Original Filed Jan. 31 1941 2 Sheets-Sheet 2

INVENTOR
Wylie G. Wilson
BY
Ramsey, Kent, Schickelgruber and Lutz
ATTORNEYS

Reissued Mar. 14, 1944 Re. 22,455

UNITED STATES PATENT OFFICE 22,455

VALVE

Wylie G. Wilson, Elizabeth, N. J., assignor to Everlasting Valve Company, Jersey City, N. J., a corporation of New Jersey Original No. 2,330,020, dated September 21, 1943, Serial No. 376,719, January 31, 1941. Application for reissue January 17, 1944, Serial No. 518,655

15 Claims. (Cl. 74—22)

This invention relates to improvements in valves and more particularly to improvements in valves of the type known to the art as plug cock valves.

An object of the present invention is to provide a valve structure and operating mechanism of such character that continuous movement of an operating member in a selected direction causes axial movement of the plug, rotation thereof and then reverse axial movement.

Another object of the invention is to provide mechanism for a valve of the character before described, which operating mechanism is so constructed that initial axial movement of the plug is accomplished without rotary movement thereof, rotary movement of the plug is accompanied by slight axial movement thereof in both directions and then following the rotary movement, accelerated reverse axial movement of the plug is accomplished without rotary movement thereof.

Another object of the invention is to provide operating mechanism of such character that initial axial movement of the plug is accomplished at an accelerated rate without rotary movement of the plug, rotary movement is accomplished in accompaniment with a slight increment of axial movement in the same direction and then with a slight reverse axial movement of the plug and finally the plug is moved in reverse axial direction at an accelerated rate.

A further object of the invention is to provide valve operating mechanism of such character that rotation of a crank like member in a single direction causes axial movement of the plug in one direction and then reverse axial movement thereof.

A further object of the invention is to provide operating mechanism as just described in which means are provided for rotating the plug during a part of the time the plug is moving axially in each direction.

A still further object of the invention is to provide in combination with operating mechanism as just described, a pinion and gear arrangement intermittently operated for causing rotation of the plug.

An additional object of the invention is to provide a simplified arrangement whereby the position of the plug in the valve casing can be adjusted to compensate for wear or for other reasons, together with a locking device for the adjusting arrangement, which locking device does not tend to change the adjustment in the act of locking.

In carrying out the foregoing and other objects of the invention, use is made of a plug cock valve made up of a casing and a plug member therein, which plug member has a through opening adapted to be aligned with the openings in the valve casing. In the drawings the plug is illustrated as being a tapered plug which would be the customary form. The plug has a stem passing through a sleeve in such fashion that the stem is free to rotate relative to the sleeve but is so held therein that relative axial movement between the stem and the sleeve is prevented. The sleeve is threaded into a second sleeve member, which in turn is threaded into a part of the supporting structure of the valve framework but which second sleeve is normally held against movement of any character. Consequently, rotation of the first sleeve in one direction will cause axial movement of the stem in one direction while a rotation of this same sleeve in the opposite direction will cause reverse axial movement of the stem. The second sleeve is provided for adjusting the relative position of the first sleeve and consequently of the stem and plug so that the plug can be properly seated in the valve body with its opening in proper relation to the openings in such body, in the case of a valve with a parallel-walled bore, and the proper seating of the plug in the body in the case of a tapered plug and bore.

Rotary movement of the first sleeve is accomplished through the agency of a connecting rod secured at one end to an extension of the sleeve and at the other end to a crank member. This crank member in turn is secured to an operating shaft whereby rotation of the operating shaft will cause such movement of the crank as to rotate the sleeve, first in one direction and then in the opposite direction. In conjunction with the connecting rod arrangement just described, the valve stem has a mutilated gear or gear sector at the upper end thereof which is adapted to be engaged by a pinion also in the form of a mutilated gear or gear sector, the engagement being carried out intermediate the ends of the cycle of movement of the operating shaft so that meshing of the pinion and the gear on the stem and consequent movement of these parts will cause rotation of the stem and of the plug. The various parts are so related that initial movement of the operating shaft causes a relatively rapid axial movement of the stem through a part of the cycle of movement of the operating shaft; then causes the rotation of the plug accompanied first by an increment of axial movement of the stem in the same direction and then by a slight reverse axial movement of the same; and finally the reverse axial movement of the stem is at an accelerated rate corresponding to the rate of initial axial movement and unaccompanied by any rotation of the stem.

Other features, objects and advantages of the invention will become apparent by reference to the following detailed description of the accompanying drawings wherein Fig. 1 is a vertical section of a valve structure embodying the invention;

Fig. 2 is a side elevation of the same structure viewed at right angles to the sectional showing of Fig. 1;

Fig. 2*a* is a view of a wrench utilized for aljusting the position of the plug in the body of the valve;

Fig. 4 is a section taken substantially on the line 4—4 of Fig. 3;

Fig. 5 is a section taken substantially on the line 5—5 of Fig. 3;

Figure 10:
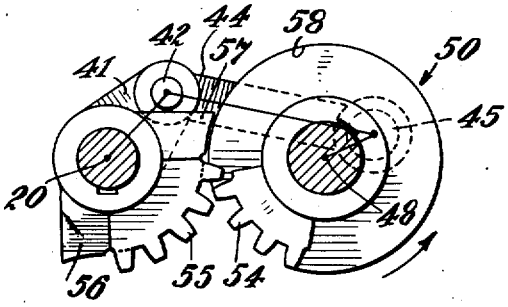
Figure 11:
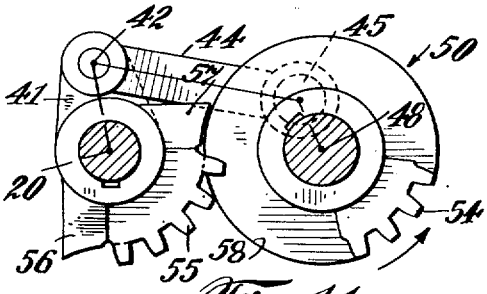

Referring now to the drawings and particularly to Figs. 1 and 2, 10 indicates generally a body of a valve of the usual plug cock type. This body has openings 11 and 12 therein to which conductors can be secured for the passage of matter to be controlled by the valve. The body of the valve is so shaped interiorly as to provide a seat for the usual plug member 14 which has a port 15 therein of size and shape to match the ports 15*a* in the valve body. In addition the lower end of the plug may be provided with a stub stem member 16 seated in the proper recess 17 in the valve body for the purpose of aiding in centering the plug, but such construction may be omitted if desired. A cover 18 of conventional character is secured to the valve body with an interposed gasket 19 in customary fashion and this cover is centrally apertured for the passage of a valve stem 20. A stuffing box for the reception of packing 21 is provided in the cover and a packing compressor 22 is threaded into the box in the usual manner.

Secured to the cover 18 by means of shoulder studs 24 is a plate 25 utilized in supporting the operating mechanism comprised in this invention. Above the packing compressor 22 the stem 20 is provided with a portion 20' of slightly reduced diameter around which portion fits a sleeve member 26. The lower end of this sleeve member contacts the shoulder on the stem formed by the two parts of different diameters. The sleeve 26 is retained on the stem against axial movement relative thereto by a mutilated gear or gear sector 27 keyed on the upper end of the stem and resting on a step provided thereon. The gear 27 will be described in detail later. It is secured to the stem and is further held on the stem by a nut 28 screw threaded on to the upper end of the stem. Since the sleeve 26 is confined between shoulder formations, i. e., the lower step on the stem and the member 27, it is restrained against axial movement relative to the stem but is free to rotate relative thereto.

The upper portion of the sleeve 26 is externally threaded as at 29 to engage similar threads provided in the inner wall of a second sleeve 30, which second sleeve in turn is externally threaded to fit the threads in the wall of an aperture in the plate 25.

Figure 3:
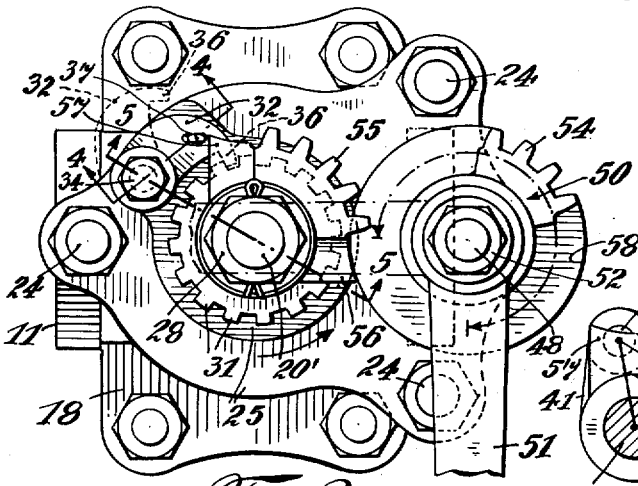
Fig. 3 is a plan view of the structure shown in Figs. 1 and 2.

The upper end of the second or adjusting sleeve 30 is provided with a flange in which teeth 31 (Fig. 3) are cut. Cooperating with the teeth 31 is a dog member 32 mounted on a fulcrum pin 34 secured to the plate 25. The dog 32 has a tongue 36 so shaped as to fit in a recess between any of the respective teeth 31 on the adjusting sleeve. This dog 32 can be moved from the full line position of Fig. 3 in which the tongue 36 is in engagement with the adjusting sleeve 30 to the dotted line position of the same figure in which this sleeve is released. Matched through openings are provided in the dog 32 and the plate 25 in such position that a cotter pin 37 (which can be split as shown) can be passed through these openings and, if the pin is split, the lower end can be spread, either forcibly or naturally, when the dog is in the locking or full line position of Fig. 3.

The purpose of this adjusting sleeve 30 is to obviate the necessity for extreme accuracy of machining of the various parts of the valve so that these parts can be properly oriented and seated by manipulation of this adjusting sleeve. For example, the plug 14 can be turned to the open position permitting passage of fluid through the valve and when in such position it can be firmly seated by rotating the adjusting sleeve 30 in the suitable direction to cause a downward movement of the sleeve 26 and consequently of the stem 20. Rotation of the adjusting sleeve can be carried out by any operator by engaging a spanner wrench S with the teeth of the adjusting sleeve and by manipulating this wrench, which rotates the sleeve in the desired fashion. When the plug has been firmly seated in the tapered recess in the valve body, the adjusting sleeve can be locked by moving the dog 32 into its locking position, in which position it is secured against movement by use of a split cotter pin in the manner shown or in any other desirable fashion.

The sleeve 26 is provided with two outwardly extending lugs 41 through which extends a pin 42 utilized for securing one end of a connecting rod 44 in position between bosses 41. The lugs are spaced apart a distance greater than the thickness of the connecting rod so that, as the lugs along with the sleeve 26 rotate with combined axial movement, relative sliding movement between the connecting rod (which does not move axially) and the pin 42 is permitted. The other end of the connecting rod 44 has a crank pin 45 extending therethrough and the connecting rod is locked to the crank pin by a split cotter pin 46. The crank pin 45 is fastened to a crank disc 47 on the lower end of an operating shaft 48 which is journalled in a bearing 49 formed as part of the plate 25. The upper end of the operating shaft 48 has a mutilated gear or gear sector 50 keyed thereon and retained by means of a handle 51 fast on shaft 48 and retained in place against axial movement by a nut 52 threaded on to the upper end of the shaft 48. Both the handle and the gear sector 50 are so secured to the operating shaft 48 that these parts must rotate as a unit.

The gear sector or pinion 50 has teeth 54 formed thereon as shown in Fig. 2 and such teeth extend through relatively small sector of the gear. Likewise the gear sector 27 on the stem 20 has teeth 55 thereon extending through a sector of approximately 90° thereof. The member 27 also has locking formations 56 and 57 adjacent the ends of the teeth 55, which locking formations can engage with the lower periphery 58 of the pinion 50. The part 58 is spaced axially from the teeth 55 to prevent contact between these parts when the gear 27 moves axially.

Figure 6:
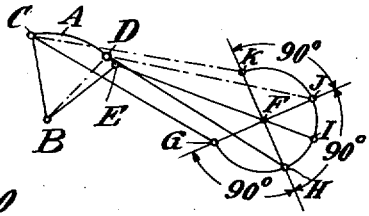
Fig. 6 is a diagram showing the relative positions of parts of the valve operating mechanism during the cycle of operation thereof, and Figs. 7 to 11 inclusive are diagrammatic illustrations of some of the operating parts of the mechanism during a complete cycle of operation thereof, the parts being shown in progressively changed positions.

The operation and use of this device is substantially as follows: for purposes of illustration reference may be made to Fig. 6 wherein the arc A represents the path of movement of the center of the pin 42 to which one end of the connecting rod 44 is pivotally secured. The point B represents the axis of the valve stem; the point C represents the position of pin 42 when the plug is in its seated condition and the points D and E represent points in the travel of this pin. The point F represents the axis of the operating shaft 48 while the points G, H, I, J, and K represent points in the travel of the axis of the crank pin 45. The lines connecting the various points C, D, E, G, H, I, J and K represent the connection between the pins 42 and 45, i. e., the connecting rod 44.

Assuming that the valve is closed, in which condition the plug is firmly seated, a cycle of operation to open the valve requires a movement of the operating handle 51 through approximately 270°. Such movement of the handle causes a movement of the crank pin 45 from the point G to the point K. During the first 90° of movement of the operating handle and consequently of the crank pin 45, the sleeve pin 42 is moved through an arc from the position C to the position D, which movement causes a rotation to that extent of the sleeve 26. Such rotation of the sleeve 26 in the stationary sleeve 30 imparts axial movement to the valve stem 20 and such axial movement is at a relatively rapid rate and causes the plug to be lifted appreciably. At the beginning of the second 90° of movement, or in other words movement of the crank pin from the position H, the movement of the sleeve pin from the position D toward the position E is greatly retarded and causes only a slight increment of axial movement up to the point E of the sleeve pin at which time the connecting rod is in what may be called dead center position. Continued movement through this second arc of 90° causes a reverse movement of the sleeve pin from the position E toward the position D at the same rate of movement as is accomplished in the movement from position D to position E. During the last 90° of movement of the crank pin from position J to position K, the reverse axial movement of the valve stem is accomplished at an accelerated rate as indicated by the diagrammatic showing of movement of the sleeve pin from position D to position C. During the second 90° of movement of the crank pin rotation of the valve stem is also carried out in a manner to be immediately described.

Figure 7:
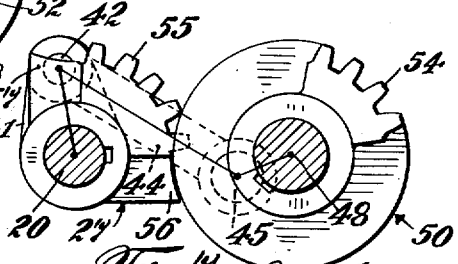

Bearing in mind then the schematic showing of the operation of the mechanism, reference is now made to Figs. 7 to 11 inclusive, which figures illustrate five positions of the operating mechanism during the movement of the valve from closed position to open position. In Fig. 7 the connecting rod 44 is shown in the same angular relation as in Fig. 6, that is with this rod extending from the point C to the point G. In this position the teeth 54 of the pinion 50 are out of mesh with the teeth 55 of the gear 27 and this latter gear is locked in place by contact between the formation 56 and the periphery 58 of the pinion 50.

Figure 8:
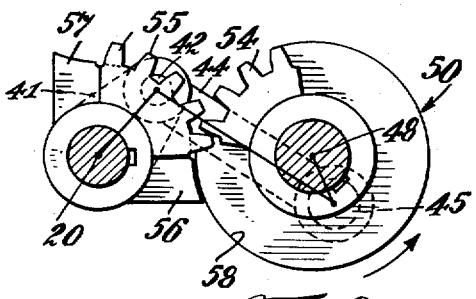
Figure 9:
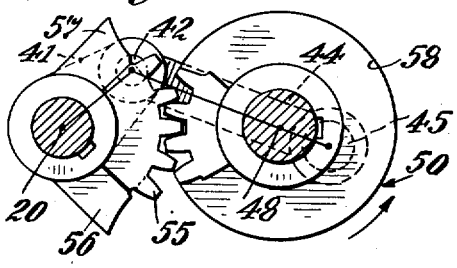

When the operating handle or lever 51 has moved through the initial 90° of movement of the crank pin 45, the operating parts assume the Fig. 8 position in which the teeth 54 of the pinion are just coming into mesh with the teeth 55 of the gear 27. This Fig. 8 position shows the connecting rod in position extending from point D to point H. During such 90° of movement the sleeve 26 has been rotated through the major part of its arc of movement causing a relatively rapid upward movement of the valve stem and consequently of the plug to unseat the plug. During the next 45° of movement of the crank pin, that is from the Fig. 8 to the Fig. 9 position, the sleeve pin 42 completes its arc of movement which is a relatively small arc as compared to the initial arc of movement consequently causing an increment of further axial movement of the plug in the same direction. At the same time the engagement of the teeth on the pinion with the teeth on the gear 27 causes rotation of the stem 20 and consequently of the plug 14. The Fig. 9 position shows the relation of the parts when the connecting rod is at dead center and at such position which is of a momentary character in the cycle of operation, the plug is stationary so far as axial movement is concerned so that any continued movement of the crank pin in the same direction starts the connecting rod to move in the reverse direction so far as the sleeve pin to which the connecting rod is secured is concerned. Consequently, a further 45° of movement shifts the connecting rod and the remaining parts from the Fig. 9 to the Fig. 10 position, in which latter figure the connecting rod assumes the position from the point D to the point J. At this time the teeth 54 move out of engagement with the teeth 55 and the gear 27 is locked by contact between the formation 57 and the periphery 58 of the pinion.

Thus in this second 45° movement the valve stem and plug are moved downwardly in unison at a relatively slow rate at substantially the same rate of movement in reverse order as that causing the before-mentioned increment of movement. The plug now being in open position the mechanism continues to operate to reseat the same, or in other words the mechanism is moved from the Fig. 10 to the Fig. 11 position, a position in which the connecting rod extends from the point C to the point K. Rotation during this 90° movement is prevented by the lock between the pinion and gear 27 before described so that the only movement of the plug is an initially accelerated and then slightly retarded downward movement until the plug is firmly reseated.

Closing of the valve requires simply a reverse movement of the operating handle through 270° or a movement of the crank pin from the position K to the position G in clockwise direction. Such reverse movement of the operating handle causes a reversal in the sequence of operation just described for opening the valve.

While the operating mechanism has been described as including the adjusting sleeve 30, it is to be understood that such sleeve can be omitted, in which event the sleeve 26 will be threaded directly into an aperture in the plate 25. However, as before pointed out, use of the sleeve 30 with the cooperating locking mechanism therefor presents advantages since such sleeve eliminates the necessity for microscopic accuracy in machining the parts to permit proper orientation thereof for efficient operation. The plug can be positioned in a desired relation to the body of the valve and then adjusting sleeve 30 can be adjusted in the manner previously described while the plug is held against rotation by holding the operating handle or lever 51. Thus, in selected positions of the plug, proper seating thereof can be obtained by preliminary adjustment of the sleeve 30, which adjustment can be accomplished without disturbing the function of any of the remaining parts of the mechanism. The locking arrangement hereinbefore described possesses special merit in that the cooperation of the dog with the teeth 31 is of such nature that the sleeve 30 can be positively locked against rotation in either direction once it has been adjusted to the desired position. The tongue 36 of the dog can be moved into the space between two teeth and due to the shape of the teeth and of the tongue, when in this position, the sleeve 30 cannot be turned in either direction. Also since simplified retaining means are used for holding the dog in tooth-engaging position, it follows that the difficulties which might be attendant upon the use of springs or other mechanism for holding the dog in engagement with the teeth are obviated. With the arrangement shown it is possible to move the dog out of tooth-engaging position and then adjust the sleeve as desired while the dog remains out of the way, in which position it is not necessary to hold the same against the action of a spring or any other mechanism.

Furthermore, the teeth serve two purposes. Due to the fact that they are of such shape as to be held against movement in either direction by a simple member such as the tongue of the dog, it is possible to make use of a spanner wrench to move the sleeve in either direction for the purpose of obtaining exact adjustment of the sleeve. Also in actual practice, the number of teeth are so related to the pitch of the exterior thread on the sleeve 30 that the axial movement due to a circumferential movement in an arc of one tooth is less than the minimum amount of adjustment ever desirable between body and plug. Consequently, extremely fine adjustment can be readily obtained.

The operating lever or handle 51 has been illustrated as being in the nature of a handle which conveniently is so locked to the operating shaft as to be lined up with the line of travel of fluid through the valve in the open position thereof. This lever, as shown, moves in one horizontal plane, or in other words, in a single plane at right angles to the axis of the valve stem. However, as will be apparent to those skilled in the art, such handle or lever could have substituted therefor a hand wheel, a chain wheel for overhead operation, an electric motor or a power cylinder, all of conventional character.

While the adjusting mechanism previously described is of advantage in connection with properly orienting a plug relative to the body of the valve and for assuring proper seating of the plug, still the operating mechanism is capable of compensating for ordinary slight wear without requiring adjustment of the adjusting mechanism. For ordinary purposes such slight wear can be compensated for by merely moving the operating mechanism further in either the opening or closing direction, which movement, in the case of a tapered plug, will cause the plug to seat itself in a tapered bore without changing the proper relation of the ports in the plug with the ports in the body when these ports are in open position.

Though the operating mechanism has been described herein principally in connection with valves utilizing a tapered plug, it will be evident that this operating mechanism can be used with valves of other construction and accordingly the invention is to be so considered.

From the foregoing it will be seen that the present invention provides new, simple and efficient mechanism for operating a plug cock valve in such fashion that the valve can be moved from open to closed position, or vice versa, without the damaging friction and the like which is normally attendant upon such operation in a valve in which axial movement is not imparted to the plug prior to rotary movement thereof. The mechanism herein described is of the utmost simplicity and permits sequential operation of the character desired through the agency of a single operating member moving continuously in a selected direction. It will be apparent that modification can be made in the disclosed mechanism, in view of which any limitations imposed thereupon are to be only those set forth in the following claims.

What is claimed is:

1. A valve of the type described comprising a casing, a stem for said valve extending from said casing, an operating member, a sleeve member surrounding said stem and movable to impart axial movement only to said stem, a crank rotated by said operating member, a connecting rod between said crank and said sleeve, and a pair of gear sectors connecting said operating members and said stem, said crank and said gear sectors being so coordinated that selected unidirectional movement of the operating member causes axial movement of the stem, first in one direction and then in reverse direction and rotation of the stem during the final stage of axial movement in one direction and the initial stage of axial movement in the reverse direction.

2. A valve of the type described comprising a casing, a stem for said valve extending from said casing, a supporting member above said casing, and a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing.

3. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, and means for locking said outer sleeve in any adjusted position thereof.

4. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve and means supported by said supporting member and engageable with the teeth of said flange for locking the outer sleeve in any adjusted position thereof.

5. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve, and a dog pivoted to said supporting member and movable to engage said toothed flange to lock said outer sleeve in any adjusted position thereof.

6. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve, and a dog pivoted to said supporting member and movable to engage said toothed flange to lock said outer sleeve in any adjusted position thereof, said dog and said supporting member being provided with apertures aligned when the dog is in toothed flange engaging position for the passage of a locking member through the apertures.

7. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve, and a dog pivoted to said supporting member for engagement with said toothed flange to lock said outer sleeve in adjusted positions, the teeth of said flange and the pitch of the external thread of the outer sleeve being so related that rotation of the flange and sleeve through an arc of one tooth causes a predetermined axial movement of the sleeve.

8. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve, and a dog pivoted to said supporting member for engagement with said toothed flange to lock said outer sleeve in adjusted positions, the teeth of said flange and the pitch of the external thread of the outer sleeve being so related that rotation to the flange and sleeve through an arc of one tooth causes a predetermined axial movement of the sleeve, and means for locking said dog in tooth engaging position.

9. A valve of the type described comprising a casing, a stem for said valve extending from said casing, a supporting member above said casing, a pair of sleeves, one threaded into the other, the innermost sleeve surrounding said stem and limiting said stem to rotation only relative to the sleeve, the outer of said sleeves being in threaded engagement with said supporting member whereby rotation of the outer sleeve causes axial movement of said stem for adjustment of said stem relative to said casing, a toothed flange on said outer sleeve, and a dog pivoted to said supporting member for engagement with said toothed flange to lock said outer sleeve in adjusted positions, the teeth of said flange and the pitch of the external thread of the outer sleeve being so related that rotation of the flange and sleeve through an arc of one tooth causes a predetermined axial movement of the sleeve, said dog and said supporting member being provided with through openings, said openings being aligned when the dog is in tooth engaging position for the passage of a dog locking member through the openings.

10. A valve of the type described comprising a casing, a stem for said valve extending from said casing, an operating member, a sleeve member surrounding said stem and movable to impart axial movment only to said stem, a crank rotated by said operating member, a connecting rod between said crank and said sleeve, and a pair of gear sectors connecting said operating member and said stem, said crank and said gear sectors being so coordinated that selected unidirectional movement of the operating member causes axial movement of the stem, first in one direction and then in reverse direction, and rotation of the stem during the final stage of axial movement in one direction and the initial stage of axial movement in the reverse direction, and means for varying the operating range of said crank and connecting rod.

11. A valve of the type described comprising a casing, a stem for said valve extending from said casing, an operating member, a sleeve member surrounding said stem and movable to impart axial movement only to said stem, a crank rotated by said operating member, a connecting rod between said crank and said sleeve, and a pair of gear sectors connecting said operating member and said stem, said crank and said gear sectors being so coordinated that selected unidirectional movement of the operating member causes axial movement of the stem, first in one direction and then in reverse direction, and rotation of the stem during the final stage of axial movement in one direction and the initial stage of axial movement in the reverse direction, and means for limiting the travel of axial movement of the stem in one direction to a lesser degree than could be accomplished by the full range of operation of said crank and connecting rod.

12. A valve of the type described comprising a casing, a stem for said valve extending from said casing, an operating member, a sleeve member surrounding said stem and movable to impart axial movement only to said stem, a crank rotated by said operating member, a connecting rod between said crank and said sleeve, and a pair of gear sectors connecting said operating member and said stem, said crank and said gear sectors being so coordinated that selected unidirectional movement of the operating member causes axial movement of the stem, first in one direction and then in reverse direction, and rotation of the stem during the final stage of axial movement in one direction and the initial stage of axial movement in the reverse direction, said crank and connecting rod having an operating range to move said sleeve through a predetermined arc, and means for shortening the path of movement of said sleeve through said arc in one direction.

13. Operating means for a shaft adapted to be moved in a straight line a predetermined distance in forward and reverse directions and rotated through a predetermined arc intermediate the initiation and completion of axial movement, said means comprising a rotatable member spaced from said shaft and having a crank thereon, a collar member surrounding said shaft in such fashion that rotation of the collar member causes axial movement of the shaft, a connecting rod between said collar member and said crank, and a driving connection between said shaft and said rotatable member, said crank and connecting rod connections and said driving connection being so related to said shaft that rotation of said driving member at a uniform rate causes axial movement of said shaft at constantly varying speed and rotation of said shaft at a uniform rate intermediate initiation and completion of the axial movement.

14. A mechanism for imparting movement to a shaft comprising a support apertured for the passage of a shaft, a rotary member mounted in said aperture to axially move said shaft, a rotatable driving member having a crank, a connecting rod between the crank and the rotary member, and gear sectors on said shaft and said driving member, rotation of said driving member causing axial movement of the shaft in successive opposite directions, said gear sectors being so coordinated as to mesh intermediate the initiation and cessation of axial movement of the shaft to rotate the shaft.

15. A mechanism for imparting movement to a shaft comprising a support apertured for the pasage of a shaft, a rotary member mounted in said aperture to axially move said shaft, a rotatable driving member having a crank, a connecting rod between the crank and the rotary member, and gear sectors on said shaft and said driving member, rotation of said driving member rotating said rotary member through an arc causing axial movement of the shaft in successive opposite directions, said gear sectors being so coordinated as to mesh intermediate the initiation and cessation of axial movement of the shaft to rotate the shaft, and means for varying the length of the arc of rotation of said rotary member.

WYLIE G. WILSON.